May 14, 1935.  A. MAIER  2,001,668
FREEWHEELING CLUTCH
Filed Nov. 29, 1933
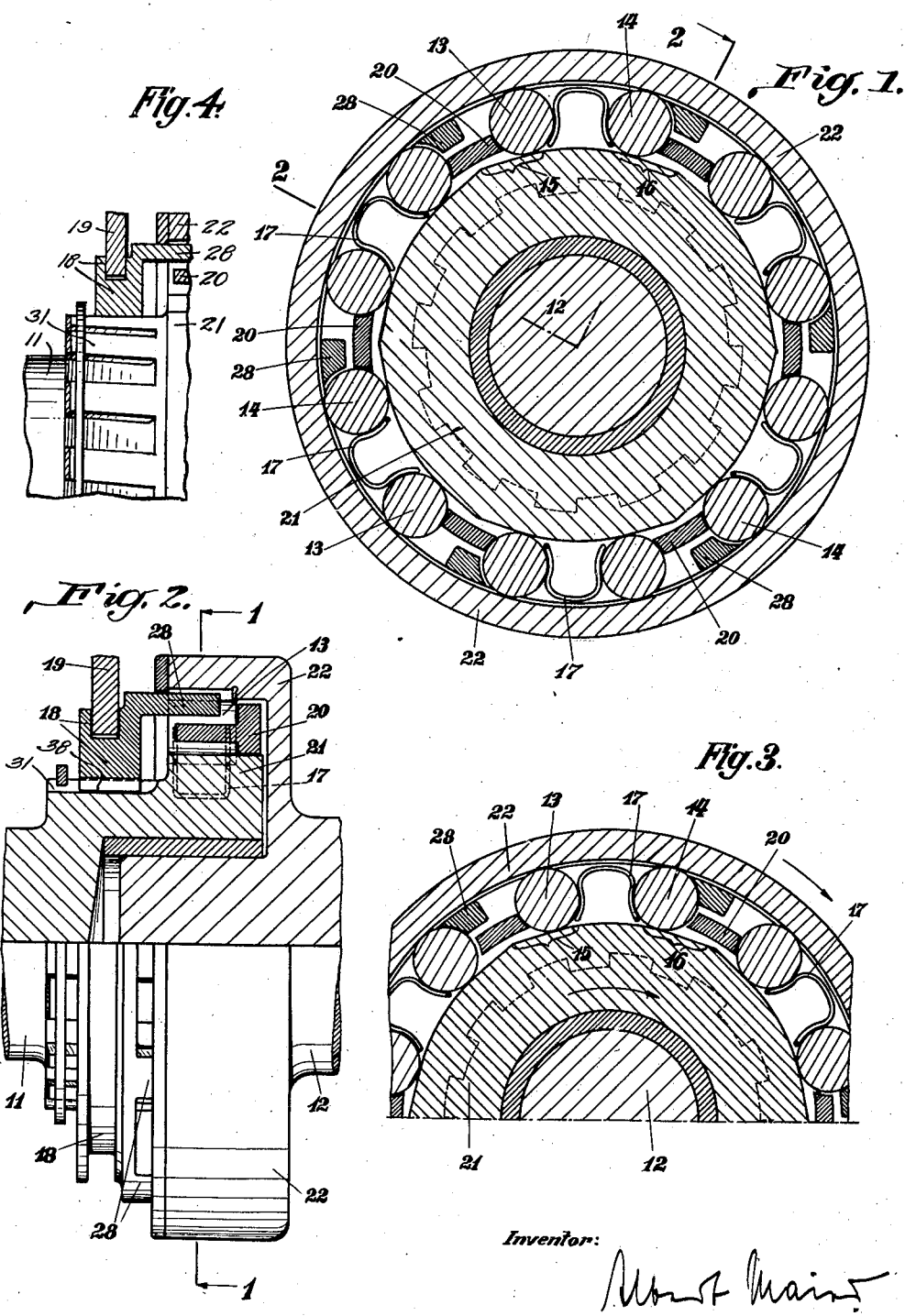

Patented May 14, 1935

2,001,668

UNITED STATES PATENT OFFICE 2,001,668

FREEWHEELING CLUTCH

Albert Maier, Friedrichshafen, Germany, assignor to Zahnradfabrik Friedrichshafen Aktiengesellschaft, Friedrichshafen, Bodensee, Germany Application November 29, 1933, Serial No. 700,201
In Germany, December 12, 1932

1 Claim. (Cl. 192—48)

My invention relates to free-wheeling clutches and has special reference to clutches of this kind which are inserted between the driving shaft and the propeller shaft of motor vehicles for the purpose of allowing free-wheeling of the car on even good roads or going down a gentle slope.

Clutches of this kind generally comprise a one-way driving device combined with a claw clutch or the like, because when going down a steeper slope it may be necessary to cut off the free-wheeling device and to have a rigid driving connection again so as to be able to use the motor for braking purposes. This driving connection is also necessary for reversing the car drive.

According to my invention I improve these conditions by providing a new kind of free-wheeling clutch. The main object of the new clutch is that it is adapted to cause a rigid driving connection in both directions, forward and backward, and that also free-wheeling conditions in forward driving direction may be set, if desired. This will be understood best when having reference to the drawing which represents an example embodying my invention.

Fig. 1 is a vertical cross section of a free-wheeling clutch, taken on line 1—1 of Fig. 2, showing the elements in both way driving conditions.

Fig. 2 in its upper portion is a longitudinal vertical section through the clutch taken on line 2—2 of Fig. 1 and in its lower portion it is a side view of the clutch.

Fig. 3 is a fragmentary cross section corresponding to Fig. 1 but showing the elements in the free-wheeling conditions.

Fig. 4 is a fragmentary longitudinal vertical section corresponding to Fig. 2 but showing the teeth on the end of the driving shaft in side view.

The driving shaft is designated by the numeral 11, whereas 12 is the driven shaft, which is journaled with its end within a recess of the ring-like end 21 of shaft 11. The outer portion of the end of shaft 12 is shaped into a sleeve 22. Between the members 21 and 22 there are inserted rollers 13 and 14. The inner circumferential surface of sleeve 22 forms a smooth circle, whereas the outer circumference of member 21 is polygonal. There are wedge-shaped surfaces 15 for rollers 13 and in the other direction wedge-shaped surfaces 16 for rollers 14. Springs 17 serve for pressing rollers 13 into the narrower space between surfaces 15 and the inner surface of sleeve 22 and rollers 14 into the narrower space between surfaces 16 and the inner surface of sleeve 22. Thus, when member 21 is driven in either direction of rotation sleeve 22 and shaft 12 rotate also, as shown in Fig. 1.

Furthermore, there is an annular member 18 having projections 28 projecting into the space between the rollers 13 and 14. Member 18 at its inner circumference has inclined teeth 38 fitting into gaps between corresponding teeth 31 on the outer circumference of the end of shaft 11. Consequently, if member 18 is shifted in the direction of the common axis of both shafts by means of fork 19 the relative position of projections 28 with regard to the wedge-shaped surfaces 15 and 16 is altered. By such means it is possible to press on rollers 14 in anti-clockwise direction and to move them a little in this direction into the wider portion of the wedge-shaped space just enough to cause disengagement between sleeve 22, rollers 14 and wedge-shaped surfaces 16 so that sleeve 22 may overrun member 21, assuming that shaft 12 for example be connected to the propeller shaft of a car rolling on after the motor connected to shaft 11 was reduced in speed or stopped. The conditions then prevailing are represented in Fig. 3.

Under the usual driving conditions as represented in Fig. 1 the rollers 13 and 14 are apt to come to comparatively close connection with the adjacent surfaces so that it becomes difficult to move rollers 14 by means of projections 28. Therefore a loose cage 20 is provided limiting the maximum distance between rollers 13 and 14.

I do not want to be limited to the details described or shown in the drawing as many variations will occur to those skilled in the art.

What I claim is:

A free-wheeling clutch comprising: an inner rotatory member; an outer rotatory member; rollers between said members; one of said rotatory members having a smooth annular surface facing said other rotatory member; the other one of said rotatory members having wedge-shaped surfaces, half of said wedge-shaped surfaces being inclined in clock-wise direction, the other half being inclined in anti-clock-wise direction; springs inserted in every other space between two adjacent rollers of said rollers, said springs being adapted to press said rollers upward along the slope of said wedge-shaped surfaces so as to cause driving connection between both said rotatory members in both driving directions; members projecting between said rollers, and means for moving said projecting members in annular direction, thereby pressing every other one of said rollers downward the slope of the respective wedge-shaped surfaces and a loose cage inserted between said rollers, adapted to limit the maximum distance between every pair of said rollers pressed apart by said springs.

ALBERT MAIER.